March 24, 1936.    N. C. STOREY    2,034,778
AUXILIARY TRANSMISSION MECHANISM FOR USE ON TRACTORS
Original Filed Oct. 9, 1933
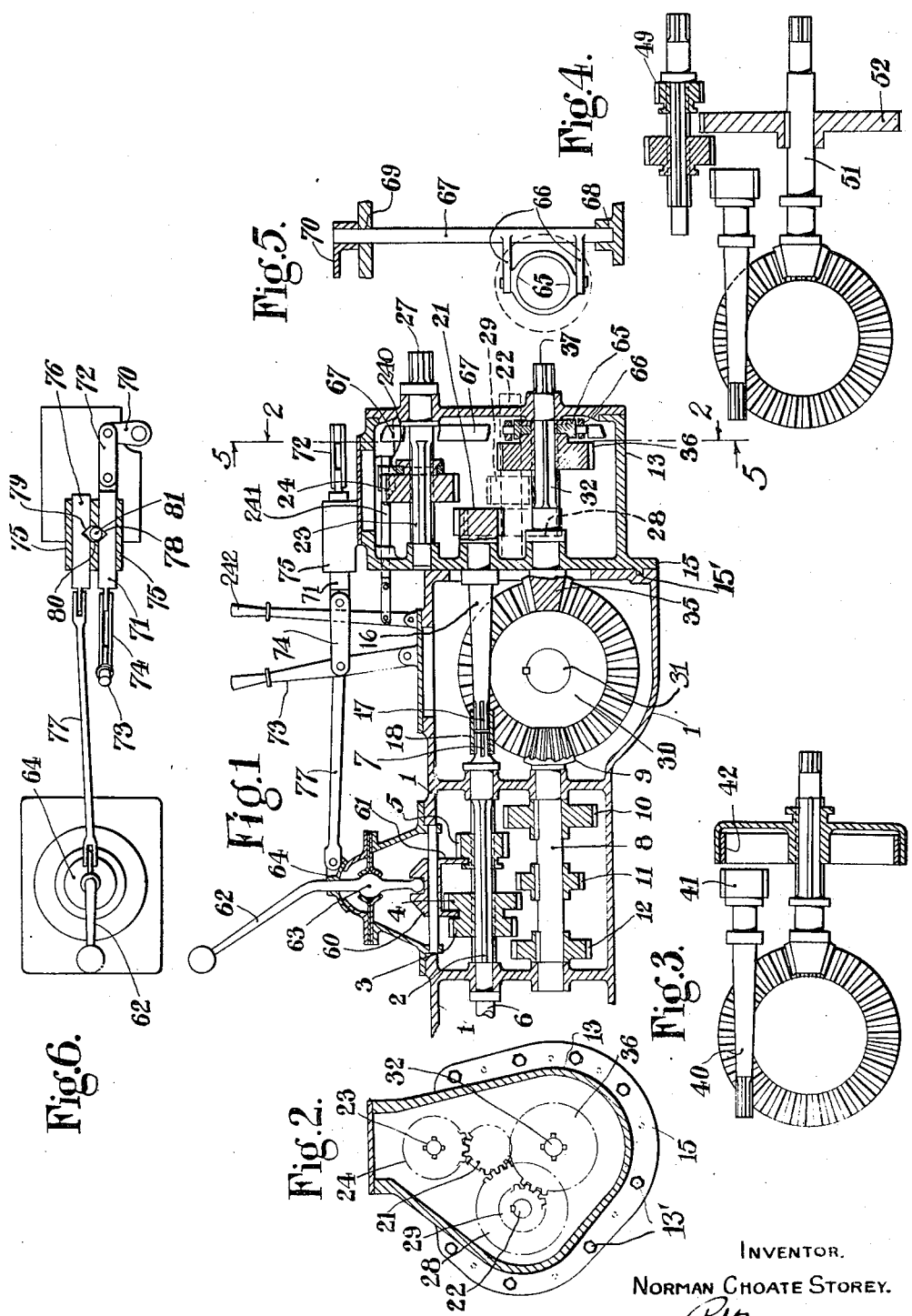
INVENTOR.
NORMAN CHOATE STOREY.
ATTORNEY.

Patented Mar. 24, 1936

2,034,778

UNITED STATES PATENT OFFICE 2,034,778

AUXILIARY TRANSMISSION MECHANISM FOR USE ON TRACTORS

Norman Choate Storey, Hunslet, Leeds, England

Original application October 9, 1933, Serial No. 692,835. Divided and this application October 9, 1933, Serial No. 692,833. In Great Britain February 3, 1933

12 Claims. (Cl. 74—326)

This invention relates to the type of transmission mechanisms used as an auxiliary to a tractor's transmission for the purpose of either a further reduction or an increase of the tractor's travelling speed over that which is provided by the tractor's own transmission.

The advantage of this invention over other types of auxiliary transmission is, that it is attached to the rear of the tractor and requires no alteration of the speed reducing gears of the tractor itself. The usual practice is to install such auxiliary transmission between the engine and the tractor's own transmission which is difficult, due to lack of room, especially in tractors where room for such a transmission was not provided for in the design. Another drawback to an auxiliary reduction gear between a tractor engine and transmission is that the first motion shaft of a tractor's transmission is usually designed only to safely carry the torque load set up by the engine and where the engine's torque is multiplied many times by a large auxiliary gear reduction, the first motion shaft is likely to fail if it is called on to carry the full load of the engine. In the case of the transmission according to the present invention the first motion shaft is relieved of its radial or gear load and is required to transmit the engine's torque only.

By the compound gear arrangement of the present invention, a wide range of gears may be used to secure mostly any driving speed either below or above the speeds obtainable through the tractor's regular gears.

Another advantage of the present transmission over other auxiliary types is that in addition to the reduction gear, a power take-off connection or connections can be provided. This is an important feature and is of paramount value when a tractor is called on to pull slow moving machinery and at the same time to furnish motor power for driving various appliances on such machinery. By a proper selection of gears, mostly any reasonable speed above or below the motor speed may be obtained. The gear driving the power take-off shaft provides an excellent clutching arrangement to put the power take-off shaft out of action when not needed.

In the annexed drawing:—

Fig. 1 represents in section a normal transmission comprising a gear box with change speed gearing therein and a bevelled gear transmission, and also an auxiliary gear box according to this invention.

Fig. 2 is a cross section approximately on line 2—2 of Fig. 1.

Fig. 3 is a longitudinal section of part of the gearing showing a modification.

Fig. 4 is a similar longitudinal section illustrating a further modification.

Fig. 5 is a detail view of part of the gear shifting means, substantially in cross section on line 5—5 of Fig. 1.

Fig. 6 is a plan view of the connections between the normal change speed lever and the striking gear of the auxiliary gear box.

The gear case 1 which houses the change speed transmission belonging to the tractor carries the first motion or main driving shaft 2 which is provided with splines to driver gears 3, 4, 5, which are mounted with a sliding fit and provided with suitable gear shifters 61. The first motion shaft 2 is carried in suitable bearings and has a forward extension 6 which connects to the engine clutch and the rear end is provided with a splined end 7 known as a power take-off and is a means of connecting the tractor's engine power with other machinery to be used with the tractor. The tractor's second motion or secondary driving shaft 8 carries a bevel drive pinion 9 and driven gears 10, 11, 12, keyed on in their respective places. A bevel gear 30 carried in an extension of the gearcase 1 is mounted on a transverse axis and provides a drive to the wheels (not shown) on both sides of the tractor, and is driven by the bevel drive pinion 9, connected to the driven shaft 31.

The auxiliary gear case 13 enclosing the auxiliary transmission mechanism of the present invention is detachably secured to the gear case 1 in any suitable manner, for example by the bolts 13' (Fig. 2) aided by the tongue and groove connection shown at 15' in Fig. 1. Such auxiliary transmission mechanism comprises a first motion or driving shaft 16 suitably supported in the auxiliary gear case and passing through an aperture in the casing 1 is connected at its forward splined end 17 as by a sleeve 18 to the power take-off 7 on the main driving shaft, thus forming a continuation thereof. The rear end of the driving shaft extension 16 carries a driving pinion 21 above which and on the same longitudinal center line is a transmission power take-off shaft 23, which is splined for a slip fit in a gear wheel 24. The transmission take-off shaft is carried in bearings in the auxiliary gear case and is splined on its rear end 27 for a suitable power take-off connection, its gear being fitted with a suitable gear shift 240 operated by a lever 241 and hand lever 242. The transmission take-off shaft need not necessarily be arranged directly above the driving pinion but may be located to one side to suit some special condition. Below a horizontal center line through the driving pinion and to one side of a vertical center line is an intermediate shaft 22 which carries a gear 28 in constant mesh with the driving pinion 21. On the intermediate shaft and to the rear of its gear wheel 28 is a pinion 29. A splined transmission shaft 32 which is mounted in bearings in the auxiliary gear case and is shown as on the same axial centre line of the tractor's second motion shaft 8 passes through an aperture in the casing 1 and carries on its forward end a bevel pinion 35 which is of the same dimensions as those of the bevel drive pinion 9 and also meshes with the wheel drive gear 30. Mounted with a sliding fit on said splined transmission shaft 32 and provided with a suitable shift is a gear 36 and on the rear end of said shaft is a second power take-off connection 37.

In Fig. 1, 60 and 61 is a conventional gear shift connecting with the tractor gears 4 and 5 and is actuated by the shift lever 62 which is supported in the socket bearing 63. 64 is a dust cover and is movable with lever 62. Sliding gear 36 of the auxiliary transmission is actuated by means of the shifter ring 65 and yoke 66 and vertical shaft 67 (Fig. 5.). Shaft 67 is carried in a foot bearing 68 at the bottom and is supported at the top by passing through the case at 69 and is rotated by means of a lever 70 (Figs. 5 and 6) securely fastened on the upper end. The plunger 71 is connected to lever 70 by links 72 and to hand lever 73 by links 74 and is carried in housing 75. Parallel to plunger 71 and carried in the same housing is plunger 76 which is connected to the dust cover 64 by means of rod 77. Plungers 71 and 76 are provided with V grooves 78 and 79 which are directly opposite each other when gears 4 and 5 and gears 36 are in their neutral positions. In the hole 80 through the housing 75 and between the V grooves is the ball 81. The diameter of ball 81 being more than the distance between the two plungers it is obvious that when one of the plungers is moved, the ball is pushed into the groove of the other thus locking it. That is, when lever 62 is pushed either forward or rearward, the ball is forced into the groove of plunger 71 thus locking it and preventing the shifting of gear 36, or when gear 36 has been put into mesh with gear 29 by movement of lever 73, plunger 76 would be likewise locked by the ball 81.

The manner in which the tractor transmission and the auxiliary transmission work is as follows:—

Power from the tractor motor is transmitted to the main driving shaft 2 through the clutch end 6 of said shaft and to apply the desired speed to the tractor wheels, one pair of gears 3—12, 4—11, or 5—10 is engaged driving the bevel gear 30 on the wheel axle or driven shaft 31 by the bevel pinion 9 on the tractor's secondary driving shaft 8. The bevel gear on the wheel axle and its driving pinion change the line of drive from a longitudinal direction to a transverse for the purpose of connecting directly or indirectly with the driving wheels on both sides of the tractor. The gear 30 on the wheel axle may be a crown wheel for a differential and form the final driving member or it may be secured to a shaft and drive the wheels through other gears or clutches as is common practice.

If it is desired to drive the tractor at another rate of speed, for example a very low rate of speed, the tractor's transmission gears aforesaid are put into a neutral position and the gear 36 on the second power take-off shaft 32, of the auxiliary transmission is pushed forward until it is in line and meshes with the pinion 29 on the intermediate shaft 22. When the parts are in this position, a driving connection from the main driving shaft 2 is obtained through the shaft extension 16, pinions 21 and 28, shaft 22, pinion 29, gear 36, shaft 32, pinion 35, and gear 30. The driven shaft 31 is thus driven at what will normally be a reduced speed, lower than any speed possible with the main transmission, although if found desirable the gear ratios may be so selected as to cause an increased speed of the shaft 31 over what is possible with the main transmission. The direction of rotation of the driven shaft 31 will be the same as if driven through the main transmission.

If power is required from the first power take-off 27 the gear 24 on the shaft 23 is pushed forward by the gear shift 240 and meshed with the driving pinion 21 or if a slow speed power drive is required the connection may be made at 37 with the second power take-off shaft.

The gear shift for the tractor's transmission and for the gear on the second power take-off shaft of the auxiliary transmission are so interlocked that only one drive can be engaged at a time.

Instead of a gear wheel 36 on the second power take-off shaft an internally toothed crown wheel 42 may be substituted to engage with the driving pinion 41 on shaft 40 (Fig. 3.) which is equivalent to the shaft 16 of Fig. 1, and the shaft 22 with its gears 28, 29 will be omitted.

Alternatively the intermediate shaft 22 may be omitted and an additional pinion 49 slidably mounted on the first power take-off shaft may be adapted to mesh with a gear 52 on the second power take-off shaft 51 as shown in Fig. 4.

It will thus be seen that by my invention I have provided an auxiliary transmission which may be readily applied to an existing tractor and which will provide a means for transmitting power to the driven shaft independently of the main transmission. Looked at in another way, the two transmissions are disposed in parallel with each other instead of in series as in the prior art, using the expressions "in parallel" and "in series" in a sense analagous to the use made of those expressions in the electrical art, in referring to electrical circuits.

While I have shown the invention as embodied in certain specific forms, nevertheless it is to be understood that various changes in details may be made without departing from the scope of the invention, as defined by the appended claims.

What I claim as my invention and desire to secure by Letters Patent of the United States is:—

1. The combination with a tractor having a motor, a primary transmission shaft, a drive for the wheels of said tractor including a bevelled crown wheel, a main change-speed gear between said primary transmission shaft and said bevelled crown wheel, and a casing for said crown wheel having apertures in the rear face thereof; of an auxiliary gear box comprising change-speed gearing, a shaft from said auxiliary gear box adapted to be coupled to the aforesaid primary transmission shaft, a bevelled pinion driven from said auxiliary change-speed gear and in mesh with the aforesaid bevelled crown wheel, and means for removably attaching the auxiliary gear box to the said casing containing the bevelled crown wheel.

2. The combination with a tractor having a motor, a primary transmission shaft, a drive for the wheels of said tractor including a bevelled crown wheel, a main change-speed gear between said primary transmission shaft and said bevelled crown wheel, and a casing for said crown wheel having apertures in the rear face thereof; of an auxiliary gear box comprising change-speed gearing, a shaft from said auxiliary gear box adapted to be coupled to the aforesaid primary transmission shaft, a bevelled pinion driven from said auxiliary change-speed gear and in mesh with the aforesaid bevelled crown wheel, means for removably attaching the auxiliary gear box to the said casing containing the bevelled crown wheel, means for putting said main change-speed gear and the auxiliary change-speed gear alternatively into action independently of each other, and means to prevent operation of one transmission while the other is operative.

3. The combination with a tractor having a motor, a primary transmission shaft, a drive for the wheels of said tractor including a bevelled crown wheel, a main change-speed gear between said primary transmission shaft and said bevelled crown wheel, a shift lever for said main change-speed gear, and a casing for said crown wheel having apertures in the rear face thereof; of an auxiliary gear box comprising change-speed gearing, a shift lever for said auxiliary change-speed gear, a shaft from said auxiliary gear box adapted to be coupled to the aforesaid primary transmission shaft, a bevelled pinion driven from said auxiliary change-speed gear and in mesh with the aforesaid bevelled crown wheel, means for removably attaching the auxiliary gear box to the casing containing the bevelled crown wheel and means for interconnecting the aforesaid change-speed gear shift levers whereby the bevelled crown wheel can only be driven through one of said change-speed gears at one time.

4. The combination with a tractor having a motor, a primary transmission shaft, a drive for the wheels of said tractor including a bevelled crown wheel a main change-speed gear between said primary transmission shaft and said bevelled crown wheel, a shift lever for said main change-speed gear, and a casing for said crown wheel having apertures in the rear face thereof; of an auxiliary gear box comprising change-speed gearing, a shift lever for said auxiliary change-speed gear, a shaft from said auxiliary gear box adapted to be coupled to the aforesaid primary transmission shaft, a bevelled pinion driven from said auxiliary change-speed gear and in mesh with the aforesaid bevelled crown wheel, means for removably attaching the auxiliary gear box to the casing containing the bevelled crown wheel and means whereby only one of said change-speed gears can be put in operation at one time comprising a rod connected to the main gear shift lever, a housing mounted on the auxiliary gear case, a plunger in said housing connected to said rod, a link connected to the auxiliary gear shift lever, a plunger in said housing connected to said link and a ball in said housing co-operating with notches in said plungers and adapted to enter the notch of one of said plungers and lock same when the other plunger is moved.

5. The combination with a tractor having a motor, a primary transmission shaft, a drive for the wheels of said tractor including a bevelled crown wheel a main change-speed gear between said primary transmission shaft and said bevelled crown wheel, and a casing for said crown wheel having apertures in the rear face thereof; of an auxiliary gear box comprising a first motion shaft adapted to be coupled to the primary transmission shaft, a driving pinion on said first motion shaft, a first power take-off shaft, a gear wheel on said take-off shaft, manually operable means for meshing said gear wheel with said driving pinion, an intermediate shaft, a gear wheel on said intermediate shaft in constant mesh with said driving pinion, a pinion on said intermediate shaft, a second motion shaft, a gear wheel on said second motion shaft, manually operable means for meshing said gear wheel with said pinion on the intermediate shaft, a bevelled pinion on said second motion shaft in mesh with said bevelled crown wheel a second power take-off connection on said second motion shaft, and means for removably attaching said auxiliary gear box to the casing containing the bevelled crown wheel.

6. In combination, a vehicle having a driving shaft and a driven shaft, a change speed transmission adapted to connect said shafts, a power take-off operatively connected to said driving shaft independently of said transmission, an independent unit comprising an auxiliary change speed transmission having a driving shaft and a transmission shaft with means to operatively connect them, said second-named driving shaft having means for connecting it to said power take-off of the first-named driving shaft and said transmission shaft having means for operatively connecting it to said driven shaft, means for detachably securing said unit to said vehicle in position to connect said driving shafts and to connect said transmission and driven shafts, and means to operate said transmissions independently of each other.

7. In combination, a vehicle having a driving shaft and a driven shaft, a change speed transmission adapted to connect said shafts, a power take-off operatively connected to said driving shaft independently of said transmission, an independent unit comprising an auxiliary change speed transmission having a driving shaft and a transmission shaft with means to operatively connect them, said second-named driving shaft having means for connecting it to said power take-off of the first-named driving shaft and said transmission shaft having means for operatively connecting it to said driven shaft, means for detachably securing said unit to said vehicle in position to connect said driving shafts and to connect said transmission and driven shafts, means to operate said transmissions independently of each other, and means to prevent operation of one transmission while the other is operative.

8. In combination, a vehicle having a driving shaft and a driven shaft, a change speed transmission adapted to connect said shafts, a power take-off operatively connected to said driving shaft independently of said transmission, an independent unit comprising an auxiliary change speed transmission having a driving shaft and a transmission shaft with means to operatively connect them, said second-named driving shaft having means for connecting it to said power take-off of the first-named driving shaft and said transmission shaft having means for operatively connecting it to said driven shaft, means for detachably securing said unit to said vehicle in position to connect said driving shafts and to connect said transmission and driven shafts, means to operate said transmissions, independently of each other, said unit comprising a casing, and one of the shafts of said unit having a power take-off accessible from the exterior of the casing.

9. In combination, a vehicle having a main driving shaft, a driven shaft extending transversely of the driving shaft adjacent one end thereof, a transmission comprising a secondary driving shaft having an operative connection with said driven shaft and a plurality of selective gear connections with said main driving shaft, means to operate said connections, a casing having a wall on the side of said driven shaft opposite said driving shafts, said main driving shaft having a power outlet in line with an opening through said wall, an independent unit comprising an auxiliary change speed transmission having a driving shaft and a transmission shaft, said second-named driving shaft adapted to extend through said opening and having means for connecting it to said power outlet of the first-named driving shaft and said transmission shaft having means for connecting it to said driven shaft, means for detachably securing said unit to said vehicle in position to connect said driving shafts and to connect said transmission and driven shafts through said wall, and means to operate said transmissions independently of each other.

10. In combination, a vehicle having a main driving shaft, a driven shaft extending transversely of the driving shaft adjacent one end thereof, a transmission comprising a secondary driving shaft having an operative connection with said driven shaft and a plurality of selective gear connections with said main driving shaft, means to operate said connections, a casing having a wall on the side of said driven shaft opposite said driving shafts, said main driving shaft having a power outlet in line with an opening through said wall, an independent unit comprising an auxiliary change speed transmission having a driving shaft and a transmission shaft, said second-named driving shaft adapted to extend through said opening and having means for connecting it to said power outlet of the first-named driving shaft and said transmission shaft having means for connecting it to said driven shaft, means for detachably securing said unit to said vehicle in position to connect said driving shafts and to connect said transmission and driven shafts through said wall, means to operate said transmissions independently of each other, and means to prevent operation of one transmission while the other is operative.

11. In combination, a vehicle having a main driving shaft extending longitudinally of the vehicle and a driven shaft extending transversely thereof, a driven gear operatively connected to said driven shaft, a transmission comprising change speed gears adapted to connect said driving shaft and driven shaft, a casing enclosing said transmission and said driven gear, an auxiliary transmission comprising a gear case and two shafts with gearing therebetween having power connections disposed outside the gear case and each adapted to pass through an opening in a wall of said casing, means to connect one of said power connections to said driving shaft and the other to said driven gear, and means to detachably secure said gear case to said casing in position for said power connections to be thus connected.

12. In combination, a vehicle having a main driving shaft extending longitudinally of the vehicle and a driven shaft extending transversely thereof, a driven gear operatively connected to said driven shaft, a transmission comprising change speed gears adapted to connect said driving shaft and driven shaft, a casing enclosing said transmission and said driven gear, an auxiliary transmission comprising a gear case and two shafts, namely, a second driving shaft and a transmission shaft with gearing therebetween, said shafts projecting from said gear case on the the same side thereof and said transmission shaft having a pinion thereon outside of said gear case, said second driving shaft and said pinion being adapted to pass through an opening in a wall of said casing, with said second driving shaft in line with said main driving shaft and with said pinion in mesh with said driven gear, means to connect said two driving shafts, and means to detachably secure said gear case to said casing in position for said driving shafts to be connected in line with each other and in position for said pinion to mesh with said driven gear.

NORMAN CHOATE STOREY.